United States Patent
Götzmann et al.

(10) Patent No.: US 7,117,709 B2
(45) Date of Patent: Oct. 10, 2006

(54) FLANGE SLEEVE AND METHOD FOR THE PRODUCTION THEREOF

(75) Inventors: Martin Götzmann, Karlsruhe (DE); Wolfgang Bickle, Reilingen (DE); Joachim Iwansky, Phillipsburg (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 285 days.

(21) Appl. No.: 10/432,357

(22) PCT Filed: Nov. 24, 2001

(86) PCT No.: PCT/EP01/13675

§ 371 (c)(1),
(2), (4) Date: May 30, 2003

(87) PCT Pub. No.: WO02/46629

PCT Pub. Date: Jun. 13, 2002

(65) Prior Publication Data

US 2004/0093733 A1    May 20, 2004

(30) Foreign Application Priority Data

Dec. 9, 2000  (DE) ................ 100 61 382

(51) Int. Cl.
*B21D 19/00* (2006.01)

(52) U.S. Cl. .............. 72/370.11; 29/898.056

(58) Field of Classification Search ........... 72/367.1, 72/370.11; 29/898.054, 898.056, 878.057; 384/296

See application file for complete search history.

(56) References Cited

U.S. PATENT DOCUMENTS

| 4,048,703 A | * | 9/1977 | Lehnhart ............... 29/898.057 |
| 4,638,538 A | * | 1/1987 | Kohama et al. ........ 29/898.054 |
| 4,796,457 A | | 1/1989 | Iijima |
| 5,609,421 A | | 3/1997 | Schulze-Eyssing et al. |

FOREIGN PATENT DOCUMENTS

| DE | 24 06 361 | 8/1975 |
| DE | 19524757 A1 | 1/1997 |
| EP | 0382170 A1 | 8/1990 |
| FR | 2 102 518 | 4/1972 |
| GB | 2126669 A | 3/1984 |

\* cited by examiner

*Primary Examiner*—Lowell A. Larson
(74) *Attorney, Agent, or Firm*—Bacon & Thomas

(57) ABSTRACT

The invention relates to a method for the production of a flange sleeve (10) especially for a sliding bearing. A strip of material is cut into lengths corresponding to the later periphery of the flange sleeve. The strip section (14) thus arising is rolled to form a hollow cylindrical sleeve with an open butt joint (12) and a collar (20) is placed around one or two sides. The open butt joint is expanded in the region of the collar to form a V-shaped slit. One or several recesses (18a, 18b) are made in the region of the later open butt joint (12) on one or two of the longitudinal edges (16) of the strip section.

9 Claims, 2 Drawing Sheets

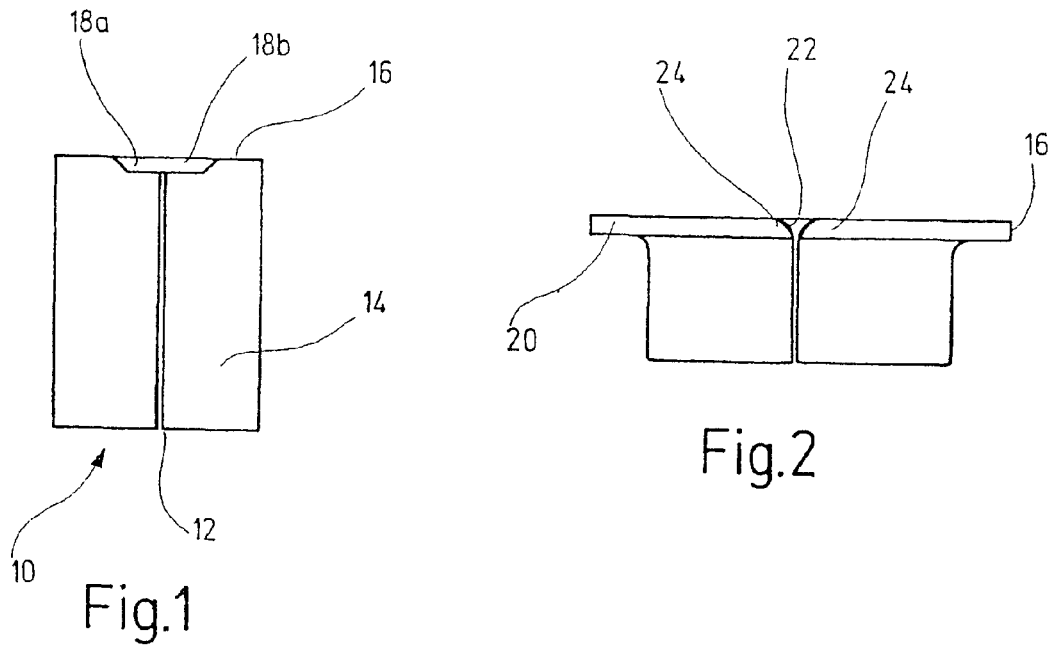
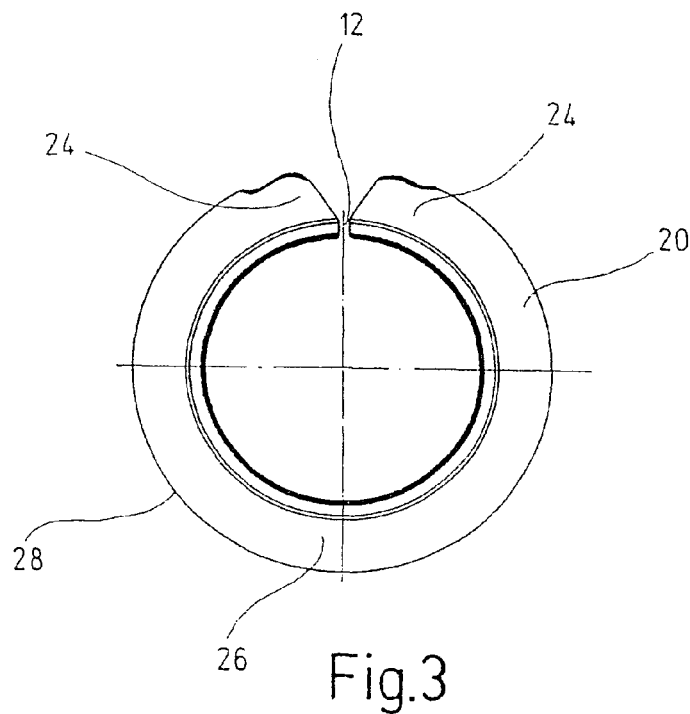

FLANGE SLEEVE AND METHOD FOR THE PRODUCTION THEREOF

FIELD OF THE INVENTION

The invention relates to a method for producing a flange sleeve, in particular for a slide bearing, in which a band material (plate) is cut to length to suit the later circumference of the flange sleeve, and the resultant band portion is roiled up into a hollow-cylindrical sleeve with a butt joint, and after the rolling, a flange is flanged over on one or both ends, whereupon the butt joint widens in the region of the flange to form a V-shaped slit.

BACKGROUND OF THE INVENTION

Such flange sleeves are used, for instance, as a slide bearing for two parts contacting one another and joined by a bolt of a flat pivot joint for doors and hatches, particularly of motor vehicles.

In such flange sleeves, there is always the problem that flowing of the material when the at least one flange is flanged over causing an uneven distribution of thickness over the circumference of the flange. When the material is flanged over, the flange material that is located opposite the butt joint is stretched to the greatest extent, and the material comprising the flange that is directly adjacent the butt joint undergoes only lesser stretching. This process is due to the bending over of the flange in the radial direction and to the increase in circumference of the flange compared to the hollow-cylindrical sleeve portion.

In the region of the butt joint, the result is that the previously closed butt joint is widened into a V-shaped slit. As a result, in the region adjacent to the slit, the flange thickness is greater than in the other regions of the flange. To assure clean, reliable function of a pivot joint, however, it is necessary for the flange to have the same thickness at every point, within certain tolerances.

It is therefore usual for the flange, after being flanged over, to be pressed in order to make the flange thickness uniform. As a result of this reshaping operation, the material flows essentially radially outward, in the region of the flange adjacent to the butt joint or to the V-shaped slit, so that after the pressing operation, the flange no longer has an essentially annular shape. On the contrary, it has a collarlike shape, and in the region of the butt joint, two points or lugs project past the circular arc of the outer diameter.

This adversely affects the properties of the pivot joint.

SUMMARY OF THE INVENTION

It is therefore the object of the invention to furnish a method for producing a flange sleeve and to furnish a flange sleeve itself which is optimized in terms of the flange thickness, and in which the flange has an essentially annular shape.

This object is attained by a method in which in the region of the later butt joint, one or more recesses is made on one or both longitudinal edges of a band portion. The making of the recesses can then preferably be done in the same work step as cutting the band material. However, it is also conceivable to make the recesses beforehand or afterward.

In particular, it is favorable to make the recesses in such a way that from the later butt joint, that is, the region of the cut edge of the band material, they extend a certain distance along the longitudinal edges of the band portions that are produced by cutting.

In particular, recesses can be provided on both cut edges of a band portion, so that when the bolt sleeve is rolled, the two recesses extend symmetrically to the right and left of the butt joint and in particular add up, before the flange is flanged over, to make one single recess.

As a result, it can be attained that the material of the flange, in the later pressing of the flange to optimize the flange thickness, will flow such that in the optimal case, the recesses are no longer present after the pressing.

In other words, the recesses are preferably designed such that they are completely filled up again by the flowing material in the process of optimizing the flange thickness. As a result, it is attained that pressing of the material comprising the flange is made possible, without the flange losing the annular shape of its outer circumference as a result of the pressing, the outer circumference extending coaxially to the hollow-cylindrical portion of the sleeve.

By employing this method, the wall thickness tolerance that can be attained without risk to the shape of the flange can be improved by 50%.

The invention also relates to a flange sleeve, in particular for slide bearing, in which the flange sleeve is rolled up from a band portion, and on one or both sides of the hollow-cylindrical sleeve a flange is flanged over; one or more recesses are provided on the outer circumference of the flange in the region of the butt joint. Once again, the recesses can be disposed symmetrically on both sides of the butt joint and can extend into the butt joint.

In particular, it can be provided that the flange sleeve comprises a slide bearing material; both metal and composite materials comprising metal and plastic can be employed.

It can be provided that before pressing, the recess extends in the circumferential direction over a length ranging from 1 to 6 times the thickness of the band portion and in the axial direction over a length ranging from 0.1 to 2 times the band portion.

The recess can have a bottom which extends parallel to the upper rim or upper edge of the flange sleeve before the flange is flanged over. The sides of the recesses can extend at an angle of <90°, that is, at a slant, from the bottom of the recess toward the upper edge.

Alternatively, however, recesses are also conceivable in which the bottom of the recess assumes an angle of between 1° and 10° to the horizontal, and the sides of the recess have a radius of 0.1 to 1 and extend in that form to the upper edge.

A further embodiment can be such that the bottom of the recess extends parallel to the upper edge, but the recess in the region of the butt joint is designed such that both recesses in the region of the butt joint add up to a V. Furthermore or as an alternative, it can be provided that on the end of the recess remote from the butt joint, the recess has a notch, which in the direction of the longitudinal axis has a depth of at least 0.25 times the thickness of the band portion and also has a width in the circumferential direction of at least 0.25 times the band thickness.

Further advantages and characteristics of the invention will become apparent from the description that follows.

One exemplary embodiment will be described in further detail below in conjunction with the drawing.

Shown are:

BRIEF DESCRIPTION OF THE DRAWINGS

FIG. 1, shows a rolled hollow-cylindrical sleeve;

FIG. 2, shows a sleeve after the flange has been flanged over;

FIG. 3, shows the sleeve of FIG. 2 in a plan view; and

DESCRIPTION OF THE PREFERRED EMBODIMENT

Figure 4:
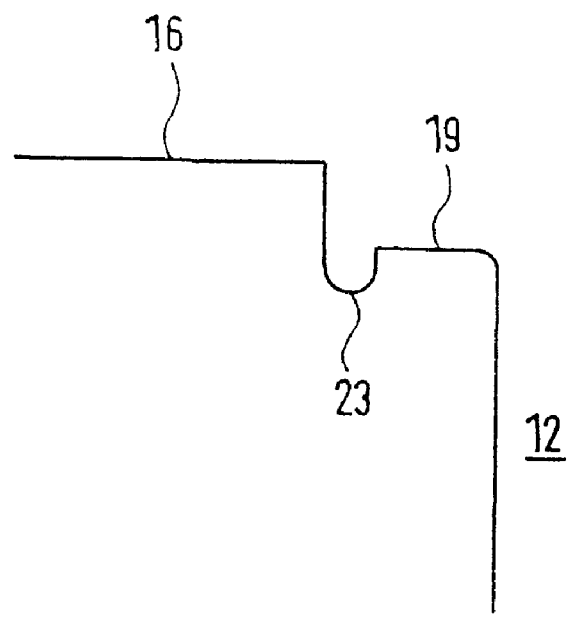
FIGS. 4 and 5, each shows one detail of a flange sleeve before the flange is flanged over.

FIG. 1 shows a rolled sleeve 10; the sleeve 10 has a butt joint 12, at which the two ends of the band portion 14, having been rolled up to make the sleeve 10, abut one another.

In the region of the butt joint 12, on a longitudinal edge 16 of the sleeve 10, recesses 18a and 18b are provided, which extend on into the butt joint 12 and along the circumference of the edge 16. The recesses 18a and 18b that extend in the circumferential direction are disposed symmetrically on both sides of the butt joint 12 and add up to make a single recess, before the flange is flanged over. The recesses 18a and 18b are located on the edge 16 that later forms the outer circumference of a flange 20, and they extend axially from this edge 16.

In FIG. 2, the upper edge 16 has now been flanged over to form a flange 20. The butt joint 12 has widened in the process into a V 22 in the region of the flange 20. Because of the V-shaped spreading of the flange 20 in the region of the butt joint 12 in the process of flanging over, the material 24 comprising the flange 20 is stretched less markedly in the region adjacent to the butt joint 12 than is the material 26 (FIG. 3) on the side of the flange 20 opposite the butt joint 12. As a result, after the flanging over of the flange 20, the flange material 24 has a greater thickness than does the flange material 26 on the opposite side of the flange 20.

To make the flange thickness uniform and thus assure trouble-free operation of the sleeve 10, for instance in a slide bearing, the flange 20 after being flanged over is pressed in order to make the flange thickness uniform. As a result of the pressing of the flange 20, the flange 20 deforms in the region 24 adjacent to the butt joint 12, and a flow process of the flange material 24 in the radial direction ensues. The material 24 flows into the region of the recesses 18a and 18b and fills them partially up again with material.

The recesses 18a and 18b are designed such that despite the flow process, the material 24 of the flange 20 does not flow past the imaginary continuation of the circular line of the outer circumference 28 of the flange 20. Interference with the circular line of the outer circumference 28 of the flange 20 impairs the properties of a slide bearing upon a rotary motion of a flat pivot joint, in which such flange sleeves 10 are often used.

Because of the provision of such recesses 18a, 18b developed in the cutting of the band material into the various band portions 14, it is possible in a technically simple way to achieve a flange sleeve 10 in which, without destruction of the imaginary circular line of the outer circumference 28 of the flange 20, the flange thickness can be optimized especially well and simply. In this way, improvements in the flange thickness tolerances of approximately 50% are possible.

For a thickness of the band material of approximately 1.5 mm, the recesses 18a, 18b can each extend approximately 6 mm to either side of the butt joint 12 in the circumferential direction. In the axial direction, the length of the recesses 18a and 18b is each approximately equal to the thickness of the band material.

Figure 5:
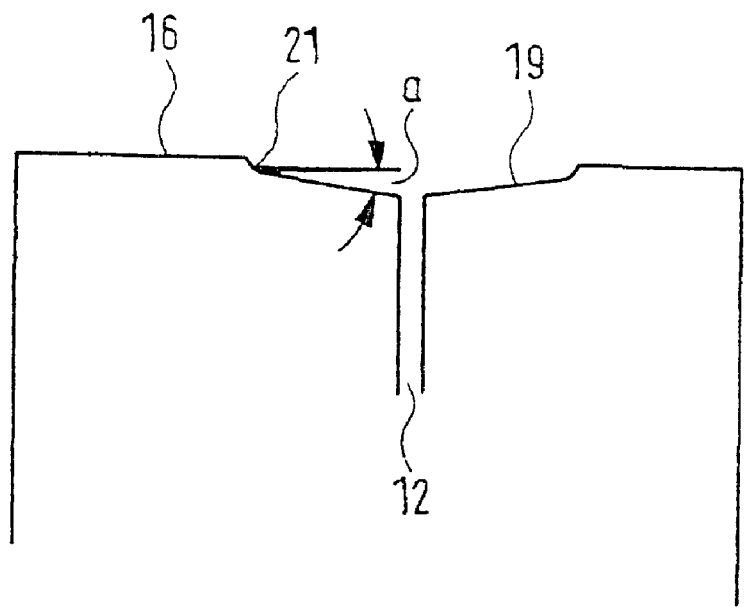

Alternatively, FIG. 5 shows an embodiment of the recess 18 in which the bottom 19 extends at an angle a of from 1° to 10° to the horizontal and drops off in the direction of the butt joint 12.

The transition 21 from the bottom 19 to the upper edge 16 is also rounded off with a radius of 0.1 to 1 of the thickness of the band material.

FIG. 4 shows a further alternative embodiment of the recess, in which the bottom 19 of the recess extends parallel to the edge 16 of the flange sleeve before the flange is flanged over.

In the transition region between the bottom 19 and the edge 16, the bottom 19 has a notch 23, which in both width and height is equal to at least 0.25 times the thickness of the band material. The notch 23 or plunge cut is rounded.

Once again, the total recess 18 has a length of approximately 1 to 6 times the thickness of the band material, and the depth of the recess in the longitudinal direction of the flange sleeve 10 is equivalent to from 0.1 to 2 times the thickness of the band material. In the length of the recess, the width of the notch 23 is also taken into account. In the longitudinal direction, the recess extends from 0.1 to 2 times as far as the bottom 19 and beyond it, once again by at least 0.2 times the thickness of the band material in the region of the notch.

In the immediate vicinity of the butt joint 12, the bottom is slightly chamfered in the direction of the butt joint 12.

The invention claimed is:

1. A method for producing a flange sleeve, comprising the steps of:
    cutting a band material to length to suit the circumference of the flange sleeve to be formed;
    rolling up the resultant cut band material into a hollow-cylindrical sleeve with a butt joint and longitudinally spaced edges;
    forming a flange flanged over on one or both ends of the cut and rolled up band material, whereupon the butt joint widens in the region of the flange to form a V-shaped slit; and
    forming one or more recesses in the region of the butt joint, said one or more recesses being formed on one or both longitudinal spaced edges of the cylindrical sleeve, which forms the outer circumference of the flange, and extends from the butt joint in the circumferential direction.

2. The method of claim 1, further comprising the step of:
    pressing the flange after being flanged over in order to make the flange thickness uniform.

3. The method of claim 2, wherein:
    pressing the material to flow in the region of the recesses, such that it does not flow past the imaginary continuation of a circular line of the outer circumference of the flange.

4. The method of claim 3, wherein:
    as a result of said pressing, the flange has an essentially annular shape.

5. The method of claim 2, wherein:
    the recesses are essentially filled up by said pressing of the flange.

6. The method of claim 1, wherein:
    the recesses are disposed such that in the rolled-up state of the hollow-cylindrical sleeve, they are present symmetrically on both sides of the butt joint.

7. The method of claim 1, wherein:
    the recesses extend into the butt joint.

8. The method of claim 1, wherein:
    the recesses extend in the circumferential direction over a length ranging from 1 to 6 times the thickness of the band portion.

9. The method of claim 1, wherein:
    the recesses extend in the axial direction over a length ranging from 0.1 to 2 times the thickness of the band portion.

* * * * *